(12) United States Patent
Tanzi et al.

(10) Patent No.: US 8,218,964 B2
(45) Date of Patent: Jul. 10, 2012

(54) ALL OPTICAL 1+1 PROTECTION UNIT USING SUB-CARRIER MODULATION PROTOCOL

(75) Inventors: Alberto Tanzi, Milan (IT); Cinzia Ferrari, Parma (IT)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 12/463,581

(22) Filed: May 11, 2009

(65) Prior Publication Data

US 2010/0284687 A1 Nov. 11, 2010

(51) Int. Cl.
*G02F 1/00* (2006.01)
*H04B 10/08* (2006.01)

(52) U.S. Cl. .............................................. 398/1; 398/17

(58) Field of Classification Search ................ 398/1, 83, 398/9, 17, 19, 20
See application file for complete search history.

(56) References Cited

U.S. PATENT DOCUMENTS 8,078,052 B2 * 12/2011 Aprile et al. .................... 398/15

* cited by examiner

*Primary Examiner* — Jack Dinh
(74) *Attorney, Agent, or Firm* — Edell, Shapiro & Finnan, LLC (57) ABSTRACT

An interface between a network component and an optical fiber section communicates with a remote interface and a remote network component at an opposite end of the optical fiber section through over-modulation of optical signals sent between the interfaces and network components. The over-modulation is at frequencies much lower than the ordinary modulation of the optical signals. The over-modulation allows communication between the interfaces for performing management, testing and maintenance operations and permits superior detection of faults in the optical fiber section.

20 Claims, 6 Drawing Sheets

ALL OPTICAL 1+1 PROTECTION UNIT USING SUB-CARRIER MODULATION PROTOCOL

BACKGROUND OF THE INVENTION

The present invention is related to optical networks and, more particularly to, protection and network management measures and procedures in such networks.

When a fault occurs in the transmission of signals from one network component to another network component, such as a break in an optical fiber, protection measures of the optical network cause the rerouting of the signals around the fault to ensure the delivery of optical signals to their destination. There are different ways to protect optical networks against faults. One protection mechanism used in point-to-point links is the 1+1 mechanism in which a source network component sends duplicate signals on two separate fibers to a destination network component. The destination network component which had been accepting the optical signals over one fiber, called the working fiber, switches to the other fiber, called the protection fiber, in case a fault occurs with the working fiber to continue receiving the signals. Another protection mechanism is the 1:1 mechanism (a special case of 1:N protection) in which the source network component sends optical signals over the working fiber to the destination network component. In case of a fault in the transmission, the source network component then switches the transmission of optical signals to the protection fiber. (In the 1:N mechanism there is one protection fiber for N working fibers.)

These protection functions are typically implemented in modules which can be inserted into equipment at different network sites. For WDM (Wavelength Division Multiplexing) systems, specific wavelength bands are defined as communication channels. It should be noted that WDM is used herein in this inclusive sense, rather than in reference to particular standards, such as the ITU (International Communications Union)—defined WDM, DWDM (Dense WDM) and CWDM (Coarse WDM). Hence optical protection modules on either side of network optical amplifiers, which help maintain integrity of the optical signals as they travel long distances through the network optical fibers, can protect all the channels on the fiber spans between optical amplifiers, called optical line sections (OTS). Likewise, optical protection modules at the respective output and input terminals of the multiplexers and demultiplexers of the WDM network, protect all the channels on the fiber spans between the multiplexers and demultiplexers, called optical multiplex sections (OMS). But in any case these sites should be able to communicate with each other for the management, testing and maintenance of such protection functions.

Heretofore such communications have been handled by ancillary network units through out-of-band communication channels, i.e., extra channels set aside for such operations. Such arrangements consume valuable resources. It would beneficial if special equipment and channels set aside for the management, testing and maintenance of protection functions were reduced to a minimum or eliminated altogether. The present invention is directed toward that goal.

DESCRIPTION OF EXAMPLE EMBODIMENTS

Overview

One aspect provides for an interface between a network component and an optical fiber section to a remote interface and a remote network component at an opposite end of the optical fiber section with the optical fiber section having transmitting optical fibers and receiving optical fibers. The interface comprises: a network component input port which receives optical signals from the network component; a network component output port which transmits optical signals to the network component; an optical fiber link output port which sends optical signals from the network component input port to the optical fiber section and the remote interface and component; an optical fiber link input port which receives optical signals from the optical fiber link for the network component output port; a switch unit which selects which receiving optical fibers of the optical fiber link for optical signals for the network component output port; a plurality of photodiode which monitor optical signals sent from the optical fiber link output port and monitoring optical signals received through optical fiber link input port; a plurality of VOAs (Variable Optical Attenuators) which control the strength of signals sent on the optical fiber link output port; and a control unit responsive to the plurality of photodiodes which controls the plurality of VOAs and the switch unit. The control unit directs protection operations upon detection of a fault on a receiving optical fiber of the optical fiber section and further directs management, testing and maintenance operations for the interface including over-modulating the optical signals sent from the optical fiber link output port at frequencies much lower than those of the data to communicate such functions to the remote interface. As an example, over-modulating may be in the range of 0.2 to 20 KHz.

Another aspect provides for a method of operating an optical protection module between a network component and an optical fiber section to a remote optical protection module and corresponding remote network component at an opposite end of the optical fiber section. The optical fiber section has transmitting optical fibers and receiving optical fibers and the method comprises: transmitting and receiving optical signals over the transmitting optical fibers and receiving optical fibers with the optical signals modulated at least one data frequency; maintaining a state of readiness to perform optical fiber protection operations upon detection of a fault on a receiving optical fiber of the optical fiber section; receiving an instruction to perform a management, testing and maintenance operation on the optical protection module; over-modulating optical signals from the optical protection module at frequencies much lower than the at least one data frequency to signal the management, testing and maintenance operation to the remote interface; and performing the management, testing and maintenance operation.

Another aspect provides for a method of operating an optical protection module between a network component and an optical fiber section to a remote optical protection module and corresponding remote network component at an opposite end of said optical fiber section. The optical fiber section has transmitting optical fibers and receiving optical fibers and the method comprises: transmitting and receiving optical signals over the transmitting optical fibers and receiving optical fibers, the optical signals modulated at least one data frequency; maintaining a state of readiness to perform optical fiber protection operations upon detection of a fault on a receiving optical fiber of the optical fiber section; receiving over-modulated optical signals at frequencies much lower than the at least one data frequency communicating a state of a management, testing and maintenance from the remote optical protection module; performing a management, testing and maintenance operation called for by the receiving over-modulated optical signals; and over-modulating optical signals from the optical protection module at frequencies much lower than the at least one data frequency to signal the management, testing and maintenance operation to the remote interface.

Figure 1A:
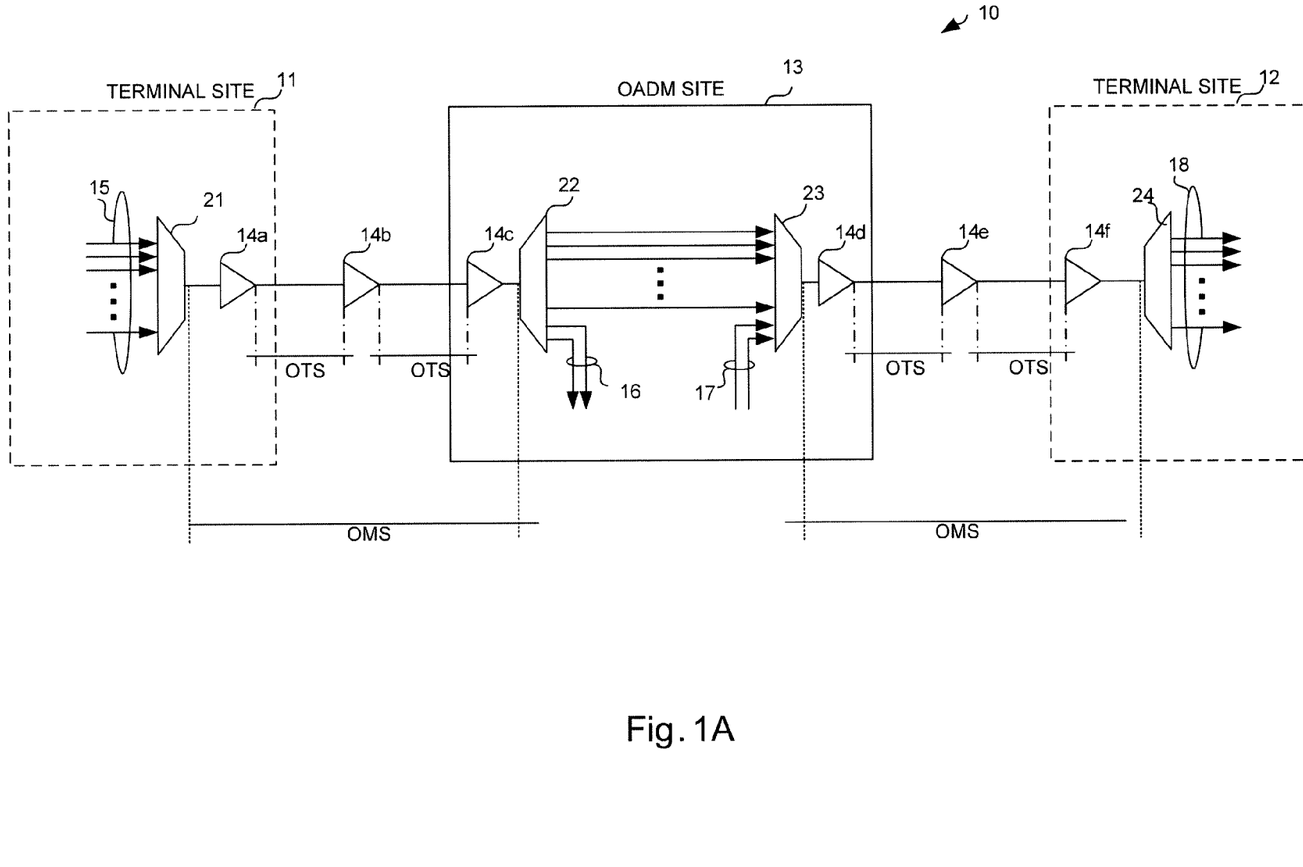
FIG. 1A is a representation of an optical network which illustrates where optical protection modules might be located.

FIG. 1A is a representation of part of a WDM network, a unidirectional WDM fiber link 10, which illustrates the possible locations of optical protection modules. The link 10 includes a transmitter terminal site 11, a receiver terminal site 12, and a representative optical add/drop multiplexer (OADM) site 13. It should be understood that this representation is a simplification of the link and not shown are a fiber link in the opposite direction and protection links in each direction.

At the transmitter terminal site 11, modulated optical signals for each of the plurality of WDM channels 15 are input to a multiplexer 21 so that the signals are combined for transmission. An optical amplifier 14a at the output terminal of the multiplexer 21 then boosts the resulting WDM signal for transmission through the fiber link. Other optical amplifiers 14b-14f along the length of the fiber ensure the quality of the WDM signal. At the other end of the link 10 is the receiver terminal site 12 in which the optical amplifier 14f restores the strength of the WDM signal before it is decomposed into signals of the constituent WDM channels 18 by a demultiplexer 24.

An OADM (Optical Add/Drop Multiplexer) site 13 shows how signals in one or more WDM channels are removed (dropped) and inserted (added) at an intermediate location between the transmitter and receiver terminal sites 11 and 12. While an OADM can be implemented in different ways, an OADM in its most simple form has a demultiplexer for the drop function and a multiplexer for the add function. As shown in FIG. 1A, a demultiplexer 22 allows the signals in one or more WDM channels 16 to be dropped from the optical fiber. The remaining WDM channels are passed to a multiplexer 23 by which the signals of one or more WDM channels 17 are added. To maintain the quality of the WDM signal, an optical amplifier 14c is placed at the input terminal of the demultiplexer 22 and an optical amplifier 14d at the output terminal of the multiplexer 23. It should be appreciated that the link 10 is merely representative so that there can be many variations including, e.g., the details of the transmitter and the receiver sites, the details of and the number of OADMs, the number of intermediate amplifiers, etc.

FIG. 1A illustrates how an optical fiber link, or parts of a link, may be protected. For example, protection can be provided for each fiber section starting or ending at an optical amplifier 14. This is OTS protection in which the optical line sections, labeled "OTS" (Optical Transport Section) in FIG. 1A are protected. Such protected sections include the OTS between the transmitter terminal site 11 with the optical amplifier 14a and the intermediate amplifier 14b; any OTS between successive intermediate amplifiers 14; the OTS's between one of intermediate amplifiers 14, here represented by the optical amplifiers 14b and 14e, and the OADM site 13 with the optical amplifiers 14c and 14d; and the OTS between a final intermediate amplifier 14, represented by the optical amplifier 14e again, and the receiver terminal site 12 with the optical amplifier 14f in the example FIG. 1A.

Instead of OTS protection, protection can also be provided at a higher network organizational level, i.e., for fiber sections between network elements, such as terminal sites and OADM sites. This is OMS protection in which multiplex sections labeled "OMS" ("Optical Multiplex Section") in FIG. 1A are protected. Such protected fiber sections include the OMS between the terminal site 11 and the OADM site 13 and another OMS between the OADM site 13 and the terminal site 12 in the example FIG. 1A network.

Figure 1B:
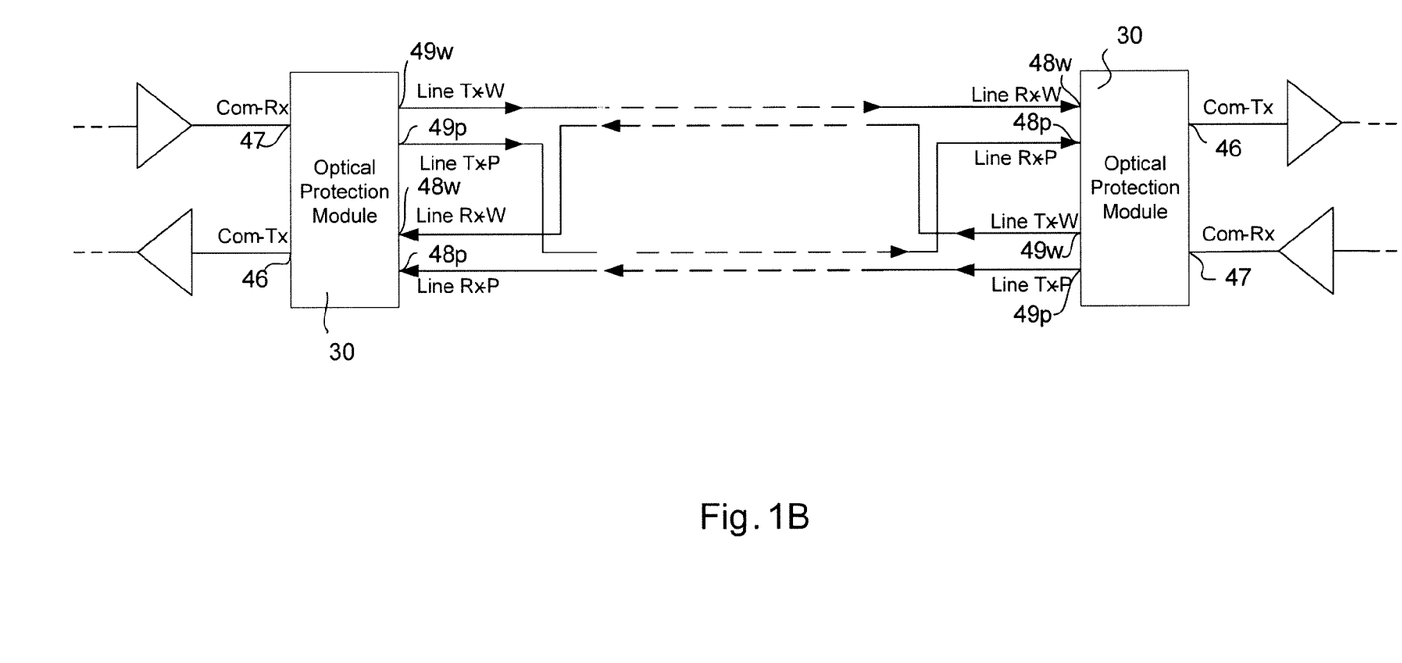
FIG. 1B illustrates the network connections between two protection modules communicating across a fiber section such as found in FIG. 1A.

Of course, in optical networks there is ordinarily at least one other optical fiber carrying signals in a return direction for two-way communication and for protection there should be at least an alternate fiber to carry signals in the first direction. FIG. 1A shows only one optical fiber carrying optical signals in one direction. FIG. 1B illustrates how optical protection modules 30 provide for 1+1 protection for a fiber section with all of the optical fibers shown. Since the protection is 1+1, there are four fibers in the fiber section, a transmitting fiber and its alternate, here labeled as Tx-W line and Tx-P line; and a receiving fiber and its alternate, labeled as Rx-W line and Rx-P line. By convention, W stands for working and P stands for protection. The optical protection modules 30 sit as interfaces between a network component and the optical fibers which are connected to a remote optical protection module and its corresponding network component across the fiber section. For OTS protection the optical protection modules are placed between each optical amplifier, the network components which define the OTS, and the section optical fibers as shown here in FIG. 1B. For OMS protection, the optical protection modules are placed between the multiplexer or demultiplexer, the network components of terminal and OADM sites which define the OMS, and the section optical fibers.

In operation, each optical protection module 30 transmits signals received through its Com-Rx port 47 (connected to the module's component) to both transmitting ports 49w and 49p for the working transmitting fiber Tx-W and for the protection transmitting fiber Tx-P respectively. The optical protection module 30 receives signals through two input ports, 48w and 48p (connected to the working receiving fiber Rx-W and the protection receiving fiber Rx-P respectively) and passes the signals from one of these fibers to the Com-Tx port 46. In normal operation signals on the working receiving fiber Rx-W are selected and upon detecting a fault in the working receiving fiber Rx-W, the protection module 30 switches over to signals on the protection receiving fiber Rx-P to pass to the port 46.

While normally transmitting duplicate signals on both the working transmitting fiber Tx-W and the protection transmitting fiber Tx-P, the optical protection module 30 during management, testing, and maintenance operations may transmit signals on only one transmitting fiber and may be required to switch between the working transmitting fiber Tx-W and the protection transmitting fiber Tx-P. Some example management, testing and maintenance operations include a "lockout" of a switchover, i.e., the prevention of a switchover from one optical fiber to another; a "forced switchover," i.e., forcing a switchover unless there is a lockout in operation; and a "manual switchover," i.e., performing a switchover unless there is a lockout or a forced switchover already in operation.

Such operations require that the opposing optical protection modules across a line section communicate with each other in some manner. A supervisory and management unit for the network could communicate to, and direct, each optical protection module if direct control lines were available to each protection module for central communication between the modules. Alternatively, optical protection modules could communicate to other protection modules along the optical fiber sections through one or more OSCs (Optical Supervisory Channels) set aside for such control. But such arrangements consume valuable resources, including ancillary units adapted to recognize and perform the management, testing and maintenance operations, and the bandwidth to carry the operational information to and from the optical protection modules. OSCs have many other uses.

Figure 2:
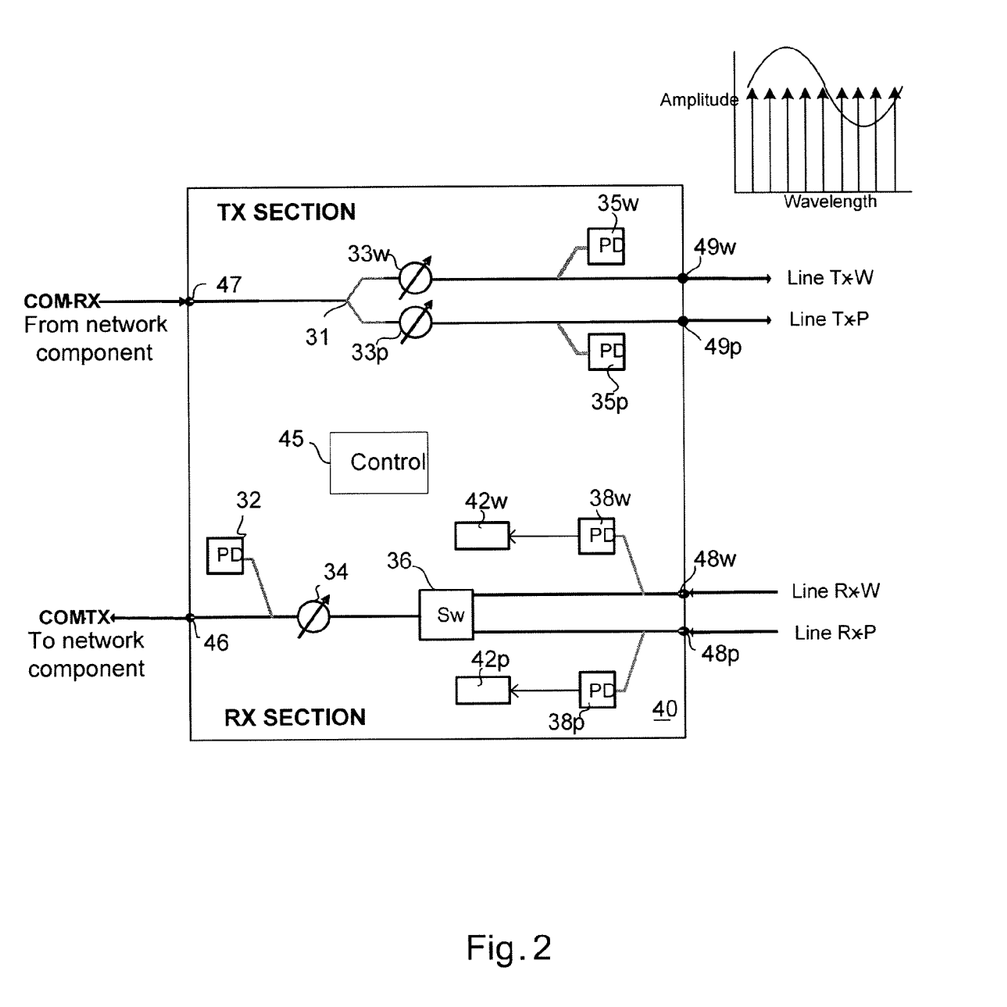
FIG. 2 is a block diagram of an optical protection module, according to one embodiment of the present invention.

Instead, the present invention utilizes the optical protection modules themselves to transmit and receive signals for the management, testing and maintenance of such protection functions. Furthermore, the WDM channels are used to carry such signals without interfering with the normal signals of the WDM channels. FIG. 2 illustrates an optical protection module 40 that can perform management, testing and maintenance operations and that can communicate with its corresponding remote module, according to the present invention.

To perform the previously described protection functions, the FIG. 2 protection module 40 has a transmission section which has the input Com-Rx port 47 which receives signals to be transmitted from the module's network component, e.g., an optical amplifier for OTS protection or a multiplexer for OMS protection, to the corresponding remote network component across the fiber section. The signals are split 50-50 by a splitter 31 for the working transmitting fiber Tx-W and for the protection transmitting fiber Tx-P through the transmitting ports 49w and 49p respectively. The power of each set of the split signals is controlled by a VOA (Variable Optical Attenuator) 33w, 33p and the effectiveness of each VOA 33w, 33p is monitored by a corresponding PD (PhotoDiode) 35w, 35p which receives a small tapped off portion of the signals from the output of the VOAs 33w, 33p.

The protection module 40 also has receiving section which has the two input ports, 48w for the working receiving fiber Rx-W and 48p for the protection receiving fiber Rx-P. The received signals from the two ports 48p and 48w and the remote network component are fed into the input terminals of a switch unit which, in this example, is a 1×2 optical switch 36, which selects whether the signals from the input ports 48w or 48p are to be passed to the output Com-Tx port 46 and the network component corresponding to the module 40. A VOA 34 controls the power of the signals to the output Com-Tx port 46 and the signals are monitored by a PD 32 which receives a small tapped off portion of the signals from the output of the VOA 34. The signals are received through the two input ports 48w and 48p are tapped off and monitored by PDs 38w and 38p which are connected to frequency detection circuits 42w and 42p respectively.

The described protection operations are controlled by a control unit 45 which receives the tapped off monitoring signals from the PDs 32, 35w, 35p, 38w and 38p (and the frequency detection circuits 42w and 42p), and sends control signals to the VOAs 33w, 33p and 34. Control lines to and from these elements are not shown.

In accordance with the present invention, the VOAs 33w, 33p over-modulate the WDM signal comb received through the port 47 at a low frequency to communicate to the remote optical protection module. That is, as each of the WDM channels is modulated to carry its individual data, typically at a data frequency of one gigabit per second or higher, there is a low frequency signal impressed upon the signals of all the WDM channels by the VOAs 33w, 33p. This amplitude modulation frequency is much lower than the modulation frequency of the individual WDM channels. As an example, a frequency range of 0.2 to 20 KHz for this sub-carrier modulation may be used. This approach is represented by the drawing in the upper right of FIG. 2. Each of the vertical arrows represents a WDM channel and the sine wave symbol superimposed on top of the arrows represents the sub-carrier modulation. The modulation depth (e.g., 5%) is preferably sufficient to be detected on the other side, i.e., at a remote optical protection module, but not so large so as to modify the instantaneous power of the channels. Different modulation tones, i.e., frequencies, are associated with a state of protection and operation so that the remote optical protection module is instructed what management, testing, and maintenance operations to undertake.

The sub-carrier modulated signals are sent through the working transmission line Tx-W through the port 49w and the protection transmission line Tx-P through the port 49p. At the remote end of the fiber section the remote optical protection module receives these signals. The photodiodes 38w and 38p in the remote module not only detect the existence of a signal on the receiving line Rx-W at the input port 46w and the receiving line Rx-P at the input port 46p, but also detect the sub-carrier tone which is associated with the protection status for management, testing and maintenance operations. The outputs of the PDs 38w, 38p are connected to frequency detection circuits 42w, 42p respectively, which can detect the particular tone (frequency) of the sub-carrier. Besides associating different tones with different protection status, simple FSK (Frequency Shift Key) modulation can be used alternatively to encode information to signal information to the remote optical protection module. In either case the two optical protection modules can exchange information across the fiber section for management, testing and maintenance operations.

An additional benefit is that the lack of over-modulation or sub-carrier tone can be used for a more reliable criterion for determining a fault in the receiving fibers, Rx-W and Rx-P. Fault or failure detection in the optical protection unit is normally performed by sensing the optical power on the incoming receiving lines Rx-W and Rx-P. Especially in case of OMS and OTS protection with WDM amplified channels, failure detection becomes problematical because the power of the optical signal cannot be easily separated from the power of the optical noise introduced by the amplifiers. Even without a message signal caused by a fault, the optical amplifiers might still generate enough noise, such as from ASE (Amplified Spontaneous Emission), to simulate the presence of a signal in the receiving fibers. By detecting the presence or absence of the over-modulation tones, the presence or absence of optical signals is positively determined and the protection switching described earlier can be performed with greater assurance.

Figure 3A:
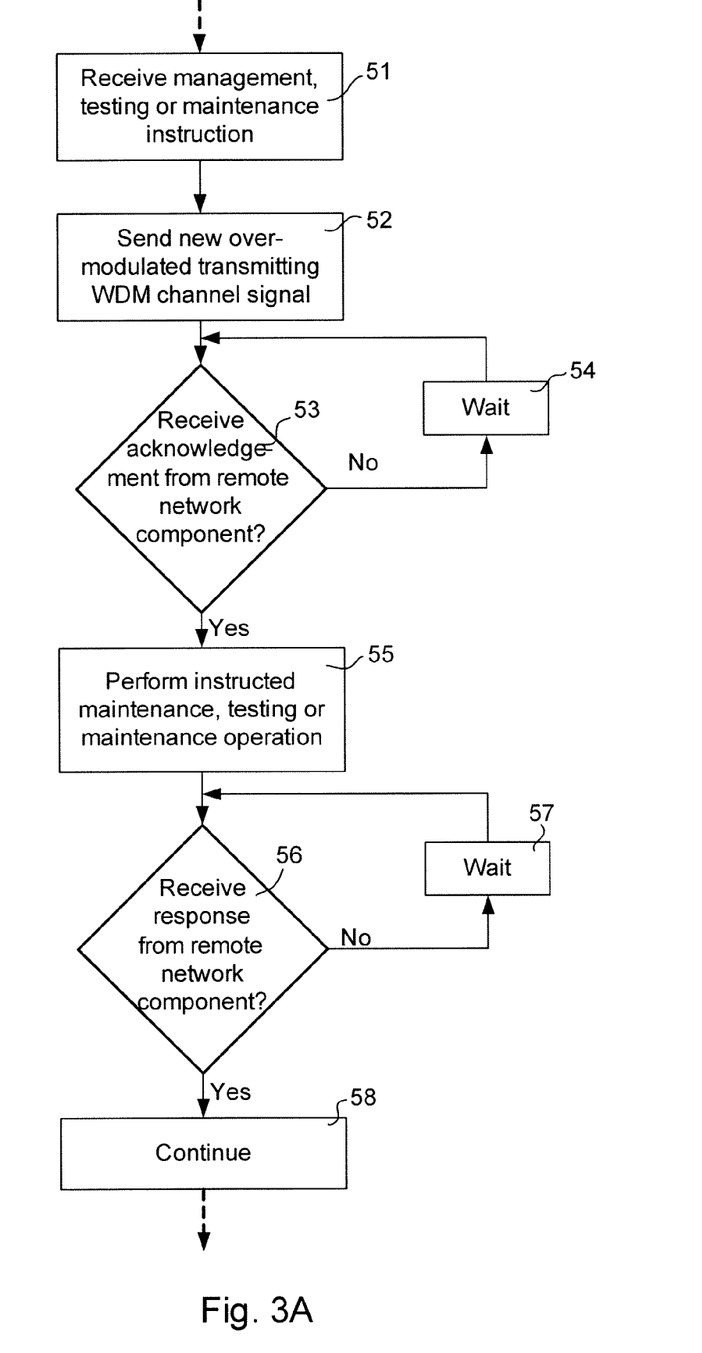
FIG. 3A is a flow chart of operations of a near optical protection module communicating with a remote optical protection module across an optical fiber section, according to one embodiment of the present invention.

FIG. 3A is a flow chart of operation steps of an optical protection module communicating across an optical line section to a corresponding remote optical protection module. The dotted arrow at the top indicates that operations are ongoing, e.g., initialization has been completed and the optical protection module is in normal operation. At this point the optical protection module is already sending an over-modulated tone over the transmitted WDM channel signal (and receiving the same) across a transmitting optical fiber (and receiving optical fiber) of the line section. As described in the previous paragraph, the presence of this tone ensures that a fault in the transmitting fiber can be detected. In step 51 the module receives some management, testing or maintenance instruction, i.e., a switchover lockout, forced switchover or a manual switchover instruction, for example. In a preferred embodiment, the command, instruction, etc. is associated with one of the specific lines. For example, lockout from line P means do not use line P whatever alarm condition or command may appear on line W. The instruction is typically issued by the network supervisory and management unit. In step 52, the optical protection module then sends a new over-modulated tone (through the specific VOA associated to the line under maintenance) which signals the requested instruction to the remote optical protection module.

Decision step 53 tests whether there is an acknowledgement from the remote optical protection module of the receipt of the new tone and the wait step 54 represents part of a loop to wait for a response. The acknowledgement is expected over the line (W or P) over which the command was sent. Upon receipt of a response from the remote optical protection module, the subject optical protection module performs the issued instruction in step 55 and decision step 56 tests whether there is a response from the remote optical protection module to the new tone and the wait step 57 represents part of a loop to wait for a response. Upon receipt of a response, the optical protection module continues its operations indicated by step 58. It should be noted that three steps 51-57 are normally only part of a management, testing or maintenance procedure which might be include a sequence of management, testing and maintenance instructions to the near and remote optical protection modules. Furthermore, it should be understood that the receipt of particular acknowledgement signals and responses from remote network components is optional, and that the over-modulation communication technique described herein need not follow any particular "hand-shaking" protocol or sequence.

For example, the instruction of step 51 might be a manual switchover. The over-modulated transmitting signal to remote optical protection module by step 52 might be switchover lockout so that the remote optical protection module does not switch off its working transmitting fiber, Tx-P, and continues sending its own WDM channel signal on both working and protection fibers. By steps 53 and 54, the subject optical protection module waits for and receives an acknowledgement that the remote optical protection module received the over-modulated transmitting signal from the near optical protection module. By step 55 the near optical protection module performs the manual switchover and waits for some response from the remote optical protection module in step 56 and 57. After receiving the response, the operation of the near optical protection module continues.

Figure 3B:
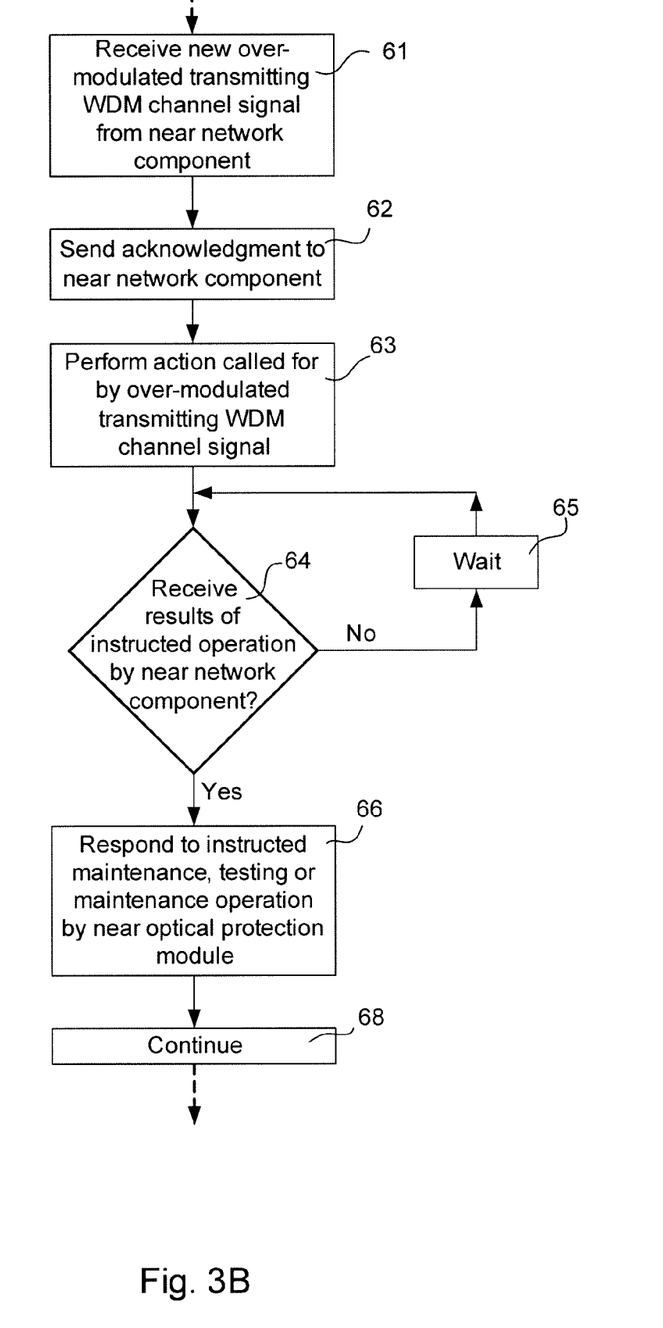
FIG. 3B is a flow chart of operations of the FIG. 3A remote optical protection module communicating with the near optical protection module across the optical fiber section, according to one embodiment of the present invention.

FIG. 3B is a flow chart of the remote optical protection module receiving steps. Again the dotted arrow at the top indicates ongoing operation including transmission by the remote optical protection module of an over-modulated tone over the module's transmitted WDM channel signal for allowing the near optical protection module to detect faults in the remote optical protection module's transmissions. The remote module also detects faults in the receiving optical fiber by breaks in the received over-modulated tones.

In step 61 the remote optical protection module receives a new over-modulated WDM channel signal from the near optical protection module on a specific line and sends back an acknowledgement on the same line. In step 63 the remote optical protection module performs whatever action, if any, is called for. In steps 64 and 65, the remote module waits for the results from whatever operations the near optical protection module had been instructed to perform and then responds to that instructed operation in step 66. The operations of the remote optical protection module continue by the step 68. As, with the process described with respect to FIG. 3A, the acknowledgements and other hand-shaking-like steps are optional.

Figure 4:
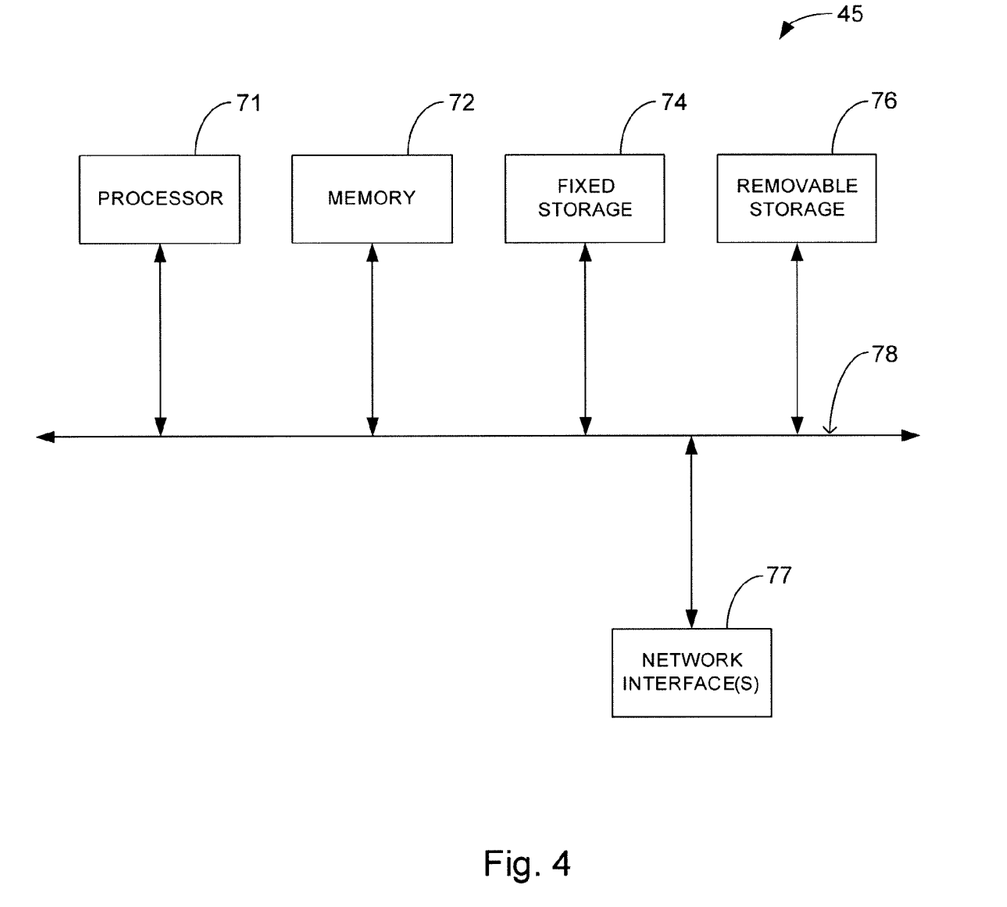
FIG. 4 is a representational diagram of the control unit of the FIG. 2 optical protection module, according to one embodiment of the present invention.

To carry out these operations each optical protection module has a control unit 45 shown in FIG. 2. The components of the control unit 45 are shown in FIG. 4 and includes a memory subsystem 72 which can store and retrieve software programs incorporating computer code that implements aspects of the present invention, data for use with the invention and the like, and a central processor subsystem 71 which, among other functions, processes the instructions and data of the computer code. Example computer readable storage media for the memory 72 include semiconductor system memory and flash memory preferably, though other storage media, such as hard drive, CD-ROM, floppy disk, and tape, might be used. The control unit 45 might further include subsystems, such as fixed storage 74 (e.g., hard drive), removable storage 76 (e.g., CD-ROM drive), and one or more network interfaces 77, all connected by a system bus 78. The network interface 77 provides a pathway for the optical protection module to communicate with the network management system, i.e., the network supervisory and management unit. Additional or fewer subsystems in the control block may be used. For example, the control unit may include more than one processor 71 (i.e., a multi-processor system), or a cache memory.

Hence the present invention efficiently incorporates the elements of an optical protection module for the operation of the module's management, testing and maintenance functions. Extra elements are not required. Furthermore, the over-modulation of the WDM channels allows the optical protection module to communicate across optical fiber sections without consuming valuable bandwidth.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. An interface between a network component and an optical fiber section to a remote interface and a remote network component at an opposite end of said optical fiber section, said optical fiber section having transmitting optical fibers and receiving optical fibers, said interface comprising:

a network component input port receiving optical signals from said network component;

a network component output port transmitting optical signals to said network component;

an optical fiber link output port sending optical signals from said network component input port to said optical fiber section and said remote interface and component, said optical signals modulated at least one data frequency;

an optical fiber link input port receiving optical signals from said optical fiber link for said network component output port;

a switch unit selecting receiving optical fibers of said optical fiber link for optical signals for said network component output port;
a plurality of photodiodes monitoring optical signals sent from said optical fiber link output port and monitoring optical signals received through said optical fiber link input port;
a plurality of VOAs (Variable Optical Attenuators) controlling the strength of signals sent on said optical fiber link output port; and
a control unit responsive to said plurality of photodiodes and controlling said plurality of VOAs and said switch unit, said control unit directing protection operations upon detection of a fault on a receiving optical fiber of said optical fiber section and further directing management, testing and maintenance operations for said interface including over-modulating said optical signals sent from said optical fiber link output port at frequencies much lower than said at least one data frequency to communicate such functions to said remote interface.

2. The interface of claim 1 wherein a particular frequency of said over-modulated optical signals communicates a state of such functions to said remote interface.

3. The interface of claim 1 wherein an FSK (Frequency Shift Key) modulation of said over-modulated optical signals communicates a state of such functions to said remote interface.

4. The interface of claim 1 wherein said over-modulation is in the range of 0.2 to 20 KHz.

5. The interface of claim 1 wherein said interface comprises an optical protection module.

6. The interface of claim 1 wherein said plurality of photodiodes detect faults on a receiving optical fiber of said optical fiber section by monitoring over-modulated optical signals received through said optical fiber link input port and sent from said optical fiber link output port of said remote interface.

7. A method of operating an optical protection module between a network component and an optical fiber section to a remote optical protection module and corresponding remote network component at an opposite end of said optical fiber section, said optical fiber section having transmitting optical fibers and receiving optical fibers, said method comprising:
transmitting and receiving optical signals over said transmitting optical fibers and receiving optical fibers, said optical signals modulated at least one data frequency;
maintaining a state of readiness to perform optical fiber protection operations upon detection of a fault on a receiving optical fiber of said optical fiber section;
receiving an instruction to perform a management, testing and maintenance operation on said optical protection module;
over-modulating optical signals from said optical protection module at frequencies much lower than said at least one data frequency to signal said management, testing and maintenance operation to said remote interface; and
performing said management, testing and maintenance operation.

8. The method of claim 7 wherein said over-modulating step comprises operating VOAs (Variable Optical Attenuators) to over-modulate optical signals sent from said optical protection module.

9. The method of claim 7 wherein said over-modulating step comprises over-modulating said optical signals at a particular frequency to communicate a management, testing and maintenance operation state to said remote optical protection module.

10. The method of claim 7 wherein said over-modulating step comprises over-modulating said optical signals by FSK (Frequency Shift Key) modulation to communicate a management, testing and maintenance operation state to said remote optical protection module.

11. The method of claim 7 wherein said over-modulating step comprises over-modulating said optical signals in a frequency range from 0.2 to 20 KHz.

12. The method of claim 7 wherein said state of readiness maintaining step comprises monitoring the presence or absence of over-modulation tones received from said remote optical protection module across said optical fiber section.

13. A method of operating an optical protection module between a network component and an optical fiber section to a remote optical protection module and corresponding remote network component at an opposite end of said optical fiber section, said optical fiber section having transmitting optical fibers and receiving optical fibers, said method comprising:
transmitting and receiving optical signals over said transmitting optical fibers and receiving optical fibers, said optical signals modulated at least one data frequency;
maintaining a state of readiness to perform optical fiber protection operations upon detection of a fault on a receiving optical fiber of said optical fiber section;
receiving over-modulated optical signals at frequencies much lower than the at least one data frequency communicating a state of a management, testing and maintenance from said remote optical protection module;
performing a management, testing and maintenance operation called for by said receiving over-modulated optical signals; and
over-modulating optical signals from said optical protection module at said frequencies lower than said at least one data frequency to signal said management, testing and maintenance operation to said remote interface.

14. The method of claim 13 wherein said over-modulating step comprises over-modulating said optical signals at a particular frequency to communicate a management, testing and maintenance operation state to said remote optical protection module.

15. The method of claim 13 wherein said over-modulating step comprises over-modulating said optical signals by FSK (Frequency Shift Key) modulation to communicate a management, testing and maintenance operation state to said remote optical protection module.

16. The method of claim 13 wherein said over-modulating step comprises over-modulating said optical signals in a frequency range from 0.2 to 20 KHz.

17. The method of claim 13 wherein said state of readiness maintaining step comprises monitoring the presence or absence of over-modulation tones received from said remote optical protection module across said optical fiber section.

18. The method of claim 13 wherein said over-modulating step comprises controlling a VOA (Variable Optical Attenuator).

19. The method of claim 13 further comprising detecting a fault on a receiving optical fiber section by monitoring an output of photodetector.

20. The method of claim 13 wherein said management, testing and maintenance operation comprises a lockout, a forced switchover, or a manual switchover.

* * * * *